Figure 1:
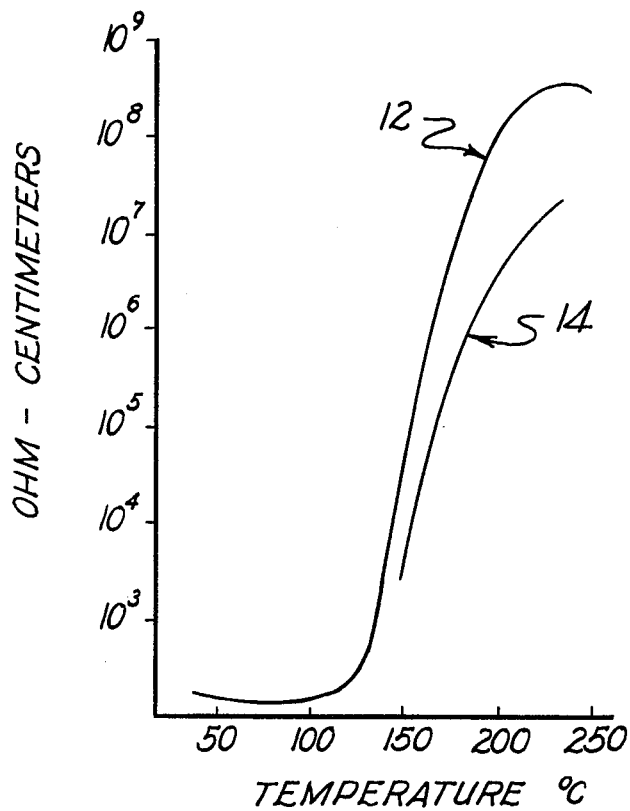

United States Patent [19]
Kulwicki et al.

[11] 4,101,454
[45] Jul. 18, 1978

[54] CERAMIC SEMICONDUCTORS

[75] Inventors: Bernard M. Kulwicki, Foxboro; Norman P. St.Martin, Taunton, both of Mass.

[73] Assignee: Texas Instruments Incorporated, Dallas, Tex.

[21] Appl. No.: 536,502

[22] Filed: Jan. 10, 1975

[51] Int. Cl.$^2$ ............................................... H01B 1/02
[52] U.S. Cl. ................................... 252/514; 252/520; 252/521; 252/518
[58] Field of Search ...................... 252/514, 520, 63.5, 252/521, 518; 106/39.5

[56] References Cited
U.S. PATENT DOCUMENTS

| | | | |
|---|---|---|---|
| 3,256,499 | 6/1966 | Khouri et al. | 252/520 |
| 3,496,433 | 2/1970 | Siegrist | 252/63.5 |
| 3,669,907 | 6/1972 | Kohashi et al. | 252/520 |
| 3,673,119 | 6/1972 | Ueoka et al. | 252/520 |
| 3,732,117 | 5/1973 | Nitta et al. | 252/63.5 |
| 3,816,348 | 6/1974 | Popowich | 252/520 |

FOREIGN PATENT DOCUMENTS 1,941,280  8/1968  Fed. Rep. of Germany ...... 252/63.5

*Primary Examiner*—Benjamin R. Padgett
*Assistant Examiner*—Josephine L. Barr
*Attorney, Agent, or Firm*—John A. Haug; James P. McAndrews

[57] ABSTRACT

Ceramic semiconductor materials of positive temperature coefficient of resistivity characterized by low room temperature resistivity, by very high peak resistivity and by excellent voltage sensitivity properties are economically produced by sintering in air. Barium and other titanate, stannate and zirconate bases are combined with silicon oxide, with manganese or ruthenium oxide and with selected rare earth oxide additives in proportions which are particularly adapted to consistently provide the desired resistivity and voltage sensitivity properties while permitting economical manufacture by use of air sintering.

Ceramic semiconductors of positive temperature coefficient of resistivity which display a very sharp increase in resistivity within a selected temperature range have been known for some time. Such semiconductor materials have been obtained by sintering certain base ceramic compositions of a perovskite structure with selected rare earth oxide additives. Such base ceramic compositions have included barium or strontium titanates, or other titanates, stannates or zirconates or combinations thereof, and the various rare earth additives or dopants have included lanthanum, cerium and yttrium.

1 Claim, 4 Drawing Figures

CERAMIC SEMICONDUCTORS

Ceramic semiconductor bodies of this type have found wide application as self-regulating heaters, as current-regulating resistors, and as current-responsive or temperature-responsive switching devices or the like and, for many of these purposes, it is desirable that the semiconductor bodies display low resistivity at room temperature, that the bodies display a very sharp increase in resistivity over a narrow temperature range, that the bodies display very high peak resistivity at a selected temperature level, and that the bodies display consistent resistivity properties at various applied voltage levels. For achieving wide application, it is also desirable that the semiconductor bodies retain their original electrical and thermal properties over a long service life, that the bodies be adapted for use in a variety of environments, and particularly that the bodies be adapted for manufacture at low cost with consistently reproducible electrical and thermal properties.

In this regard, it had been found that semiconductor materials which display very high peak resistivities at low input voltages could be obtained by the use of manganese oxide additions to the base ceramic compositions. However, these manganese-modified materials have had poor voltage sensitivity properties and have tended to display much lower peak resistivities at higher applied voltage levels. These modified materials were also found to have other undesirable characteristics which tended to deter successful application of the semiconductor materials. It had then been found that the further use of silicon additions would improve the voltage sensitivity properties of manganese-modified semiconductor materials where the materials were sintered in selected atmospheres but it had not been possible to achieve consistently reproducible materials of this type having suitably low room temperature resistivity, having high peak resistivities and good voltage sensitivity characteristics while using the same convenient and economical techniques which are conventionally used in semiconductor manufacture.

It is an object of this invention to provide novel, improved low cost ceramic semiconductor materials; to provide such materials which have low room temperature resistivity; to provide such semiconductor materials which display very high peak resistivity; to provide such materials which have excellent voltage sensitivity properties; and to provide such materials which are adapted to be manufactured using conventional manufacturing techniques including air sintering.

Other objects, advantages and details of the novel and improved ceramic semiconductors of this invention appear in the following detailed description of preferred embodiments of the invention, the detailed description referring to the drawings in which:

FIGS. 1-4 are graphs illustrating the electrical and thermal properties of the ceramic semiconductor materials of this invention.

The base ceramic composition utilized in this invention preferably comprises barium titanate alone or barium titanate with partial substitution of other titanates such as calcium titanate, lead titanate or strontium titanate or with partial substitution of corresponding stannates and zirconates. Typically a stoichiometric or slightly titanium-rich composition is used, the composition preferably incorporating an excess of not more than about 2 mol percent titanium oxide. In preferred embodiments of this invention, for example, the base ceramic composition comprises barium titanate alone, a mixture of barium and strontium titanate, a mixture of barium and calcium titanate, or a mixture of barium, calcium and strontium titanates, such compositions incorporating an excess of titantium in the range from 0 to 2 mol percent.

In accordance with this invention, additions are made to these base ceramic compositions, these additions including silicon oxide, an activator selected from the group consisting of manganese and ruthenium oxide, and certain dopants such as selected heavy rare earths of relatively small ionic radius, the proportions of these additions each being maintained within precisely controlled limits for achieving the objectives of this invention. Thus, it has been found that additions of certain light rare earths such as lanthanum, cerium and samarium of relatively large ionic radius have tended to produce ceramic semiconductor materials having excessively high room temperature resistivities when such dopants have been used with manganese and silicon-modified materials. Accordingly, it is an important part of this invention that the dopants used for the base ceramic compositions be limited to yttrium, niobium and the rare earths heavier than dysprosium. Preferably, for example, the dopants are limited to yttrium, dysprosium, holmium and niobium. Preferably also, the proportion of these dopants are maintained at relatively low levels in the range from about 0.25 to 0.60 mol percent, thereby to obtain ceramic semiconductor materials having room temperature resistivities on the order of about 100 ohm-centimeters or less. For example, where the preferred yttrium dopant is used, the addition to the base ceramic composition is preferably maintained within the range from 0.35 to 0.60 mol percent; holmium is preferably used in the range from 0.35 to 0.60 mol percent; dysprosium is preferably maintained in the range from 0.30 to 0.45 mol percent; and, where a niobium dopant is used, the dopant addition is preferably from 0.20 to 0.30 mol percent.

It is found that the silicon oxide addition must be controlled within narrow limits. Thus, silicon additions to the composition of less than about 2.0 mol percent tend to produce ceramic semiconductor materials having excessive voltage sensitivity whereas use of more than about 4.0 mol percent silicon tends to cause deterioration of the peak resistivity of the semiconductor materials. Preferably then, in accordance with this invention, the silicon addition to the base ceramic composition is maintained in the range from 2.0 to 4.0 mol percent to obtain semiconductor materials having peak resistivities in excess of $10^7$ ohm-centimeters at low applied voltages and to maintain peak resistivity of the materials on the order of about $10^6$ ohm-centimeters at applied voltages of greater than about 600 volts per centimeter.

In accordance with this invention it has also been found that, if semiconductor materials having desired low room temperature resistivities on the order of 100 ohm-centimeters or less are to be obtained, much lower additions of manganese must be used than was previously thought necessary. Thus, in the preferred embodiments of this invention, the manganese addition to the base ceramic composition is maintained within the range from about 0.03 to 0.10 mol percent. Alternately, if desired, the manganese activator is replaced with ruthenium as an activator, the addition of ruthenium preferably being maintained in the range from about 0.001 to 0.02 mol percent.

If desired, aluminum additions up to about 0.5 mol percent may also be made to the base ceramic compositions in conventional manner to regulate resistivity.

In using the base ceramic compositions with additions thereto controlled within limits as above-described, it is possible to sinter the compositions in air in a very economical and convenient manner while still achieving semiconductor materials of desirable and consistently reproducible electrical and thermal properties. That is, any conventional starting materials are used and are mixed and calcined in any conventional manner. Typically, for example, the starting materials of the base compositions comprise barium, strontium, calcium and lead carbonates and titanium dioxide whereas the additions thereto are made with manganese carbonate and silicon dioxide and with oxides of ruthenium of the selected rare earths or other dopants, and of aluminum. Where such starting materials are used, the materials are commonly mixed by ball milling or in other conventional manner and are then calcined. Alternately where other starting materials are used, other conventional techniques are used for mixing and calcining the materials.

In accordance with this invention, the calcined materials in proportions as provided by this invention are then combined with a small quantity of an organic binder in conventional manner and are further mixed and sieved and are pressed to form disc elements of a thickness of about 0.100 inches and a mass of about 20 grams, also in a conventional way. Finally, in accordance with this invention, the pressed discs are sintered in air in any convenient and economical way. Preferably, for example, the pressed discs are initially heated in air at a temperature on the order of 1200° C., below the temperature at which any liquid phase occurs. It is believed that this preheating or heat soaking allows orderly grain growth to occur prior to liquid phase formation and minimizes grain growth at the peak sintering temperature. Preferably, also the pressed disc elements are then fired in air at a peak sintering temperature in the range from 1300° C. to about 1450° C. for from 15 to 30 minutes, the temperature and duration of the peak sintering temperature being selected with respect to the specific materials used and with respect to the mass of the disc elements. Preferably, for example, where the base ceramic composition comprises barium titanate, the pressed disc elements are fired at a peak temperature of about 1350° C. Where the base ceramic compositions include 10 or 20 mol percent strontium titanate, the peak sintering temperatures are preferably 1375° C. and 1400° C. respectively. Alternately, where the base composition comprises barium titanate with 10 mol percent of lead titanate, a lower peak sintering temperature of about 1335° C. is used. Where the pressed disc elements have a mass of about 20 grams, the elements are preferably fired at peak temperature for about 15 minutes. The shortest possible sintering time adequate for completely sintering the discs is preferred to minimize excessive grain growth in the elements. Thereafter, firing of the pressed discs in air is preferably continued for about 1 to 4 hours at a lower or anneal temperature on the order of 1225° C. Finally, layers of electrically conductive materials are applied to the opposite disc surfaces of the sintered elements to provide ohmic contact to the elements in a conventional manner.

In this way, the ceramic semiconductor materials of this invention are provided with desirable properties as above-described. That is, when the above-noted additions are made to the described base compositions, and when these compositions are sintered in air as noted above, the resulting ceramic semiconductor reaction products are characterized by low room temperature resistivity on the order of 100 ohm-centimeters or less; are characterized by very high peak resistivities of about $10^7$ ohms-centimeters or more; and are characterized by excellent voltage sensitivity properties, by improved retention of resistivity properties over a long service life, and by stability in use in a variety of environments. Most important, these desirable properties are consistently reproducible in an economical and convenient manner by sintering in air.

For example, in a preferred embodiment of this invention, conventional starting materials are combined in proportions to produce a base ceramic composition comprising 90 mol percent barium titanate and 10 mol percent calcium titanate, the base composition having an excess of 1 mol percent titanium. To these base composition starting materials are then added selected starting materials to add 2 mol percent silicon oxide 0.08 mol percent manganese oxide, 0.40 mol percent holmium oxide and 0.10 mol percent aluminum oxide. After suitable mixing, calcining, sieving, addition of organic binder and pressing to form disc elements of about 20 grams mass having a thickness of about 0.100 inches as above-described, the pressed discs were preheated at a temperature of 1200° C. for 1 hour in air, were fired in air at a peak sintering temperature of 1360° C. for about 15 minutes, and were thereafter maintained in air at a temperature of 1225° C. for about 3 hours. After application of ohmic contact layers to opposite surfaces of the sintered discs, the resulting ceramic semiconductor reaction product displayed electrical and thermal properties as illustrated in FIG. 1. That is, with input voltage at a minimum (less than 1 volt per centimeter), the reaction product displayed a room temperature resistivity on the order of about 100 ohm-centimeters, displayed a very sharp increase in resistivity over a narrow temperature range, and displayed a peak resistivity on the order of $10^8$ ohm-centimeters at a temperature of about 225° C. as illustrated by curve 12. Similarly, when the same semiconductor element was tested at an applied voltage level of about 700 volts per centimeter, the element displayed significant voltage independence by providing a peak resistivity of better than $10^7$ ohm-centimeters as illustrated by curve 14 in FIG. 1. The semiconductor elements also displayed good retention of its resistivity properties in use and was stable in various conventional environments in which such elements are commonly used.

Figure 2:
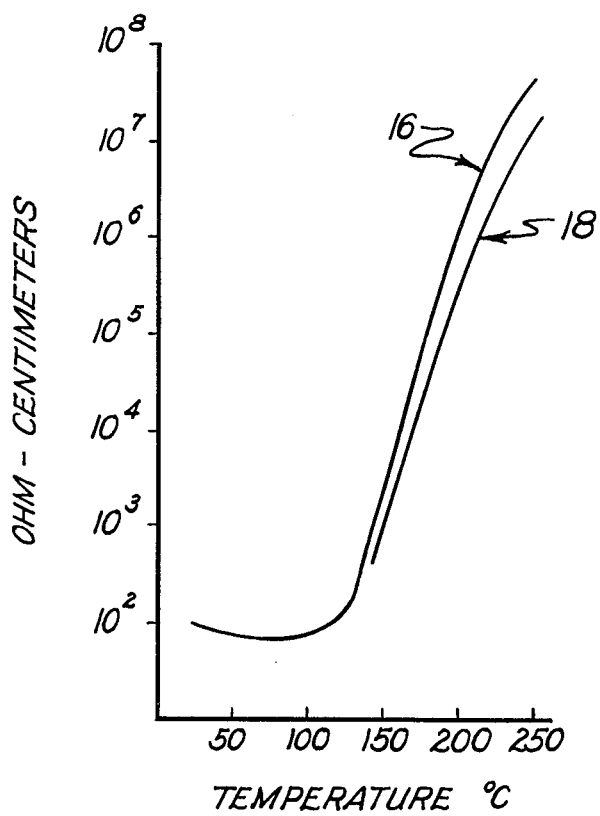
Figure 3:
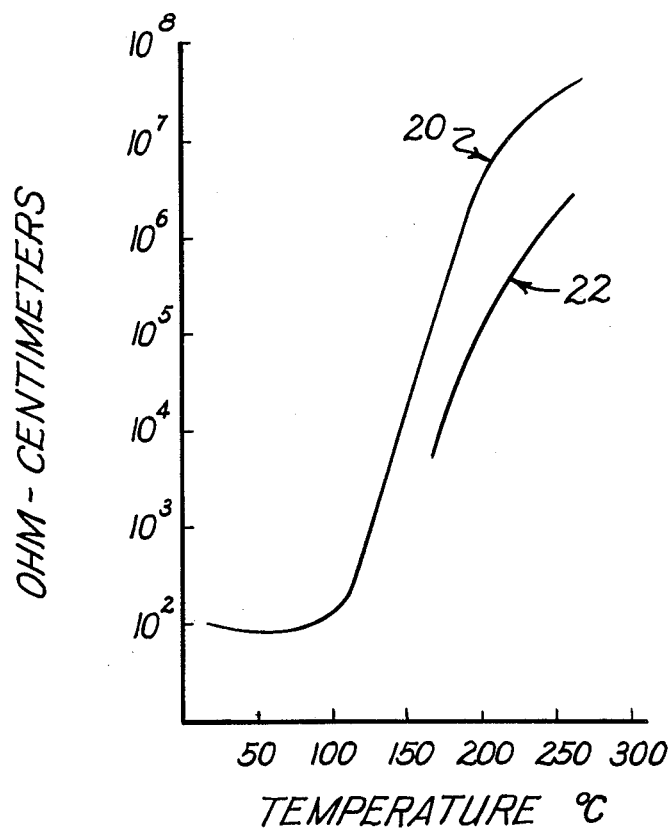
Figure 4:
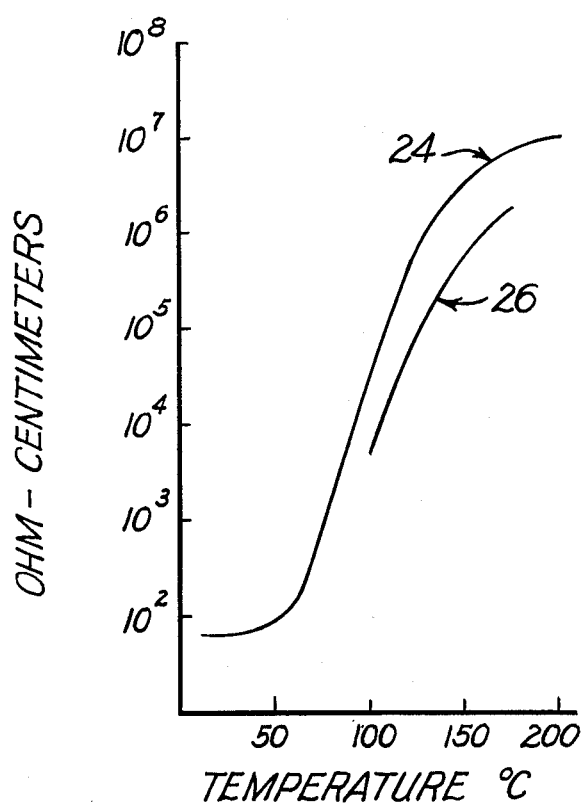

In another preferred embodiment of this invention, the base ceramic composition comprised barium titanate alone having no excess of titanium. To this base composition was added 4 mol percent silicon, 0.06 mol percent manganese, 0.55 mol percent yttrium, and 0.20 mol percent aluminum. After mixing and calcining and after binder addition and pressing as noted above, the composition was preheated in air at 1200° C. for 1 hour, was fired in air at a peak sintering temperature of 1360° C. for 20 minutes, and was then maintained in air at a temperature of 1225° C. for 90 minutes. After addition of ohmic contacts, the sintered elements displayed properties as shown in FIG. 2. That is, at minimum applied voltage levels, the elements displayed room temperature resistivity of 100 ohm-centimeters and peak resistivity at 250° C. of better than $10^7$ ohm-centimeters as illustrated by curve 16 in FIG. 2. Similarly, at an applied voltage level of about 210 volts per centimeter, the semiconductor elements showed only very slight decrease in peak resistivity as illustrated by curve 18 in FIG. 2.

In another preferred embodiment of this invention, the base ceramic composition comprised 90 mol percent barium titanate, 5 mol percent strontium titanate, and 5 mol percent calcium titanate, without excess of titanium. To this base composition was then added 4 mol percent silicon, 0.06 mol percent manganese, 0.55 mol percent yttrium, and 0.20 mol percent aluminum. After preparation of pressed disc elements as above-described, the elements were preheated in air at 1200° C. for 1 hour, were fired in air at 1350° C. for 15 minutes, and were maintained in air at 1225° C. thereafter for 3 hours. As shown by curve 20 in FIG. 3, these semiconductor elements provided with ohmic contact layers displayed room temperature resistivity of about 100 ohm-centimeters and peak resistivity of better than $10^7$ ohm-centimeters at 250° C. under low applied voltage and, as shown by curve 22 in FIG. 3, also displayed excellent peak resistivity even at applied voltage levels of 685 volts per centimeter.

In another preferred embodiment of this invention, the base ceramic composition comprised 80 mol percent barium titanate and 20 mol percent strontium titanate without excess of titanium. To this base composition was added 20 mol percent silicon, 0.03 mol percent manganese, and 0.35 mol percent yttrium. After preparation of pressed disc elements as above-described, the elements were preheated in air at 1200° C. for 1 hour, were fired in air at 1400° C. for 15 minutes, and were maintained in air at 1225° C. for an additional 2 hours. As shown by curve 24 in FIG. 4, these semiconductor materials displayed room temperature resistivity of less than 100 ohm-centimeters and peak resistivity at 200° C. of better than $10^7$ ohm-centimeters at low applied voltage levels and, as shown by curve 26 in FIG. 4, retained excellent peak resistivity even at an applied voltage of 600 volts per centimeter.

These and other preferred examples of the ceramic semiconductor materials of this invention are set forth in Table I, this table further illustrating the desirable peak resistivities achieved by showing the logarithm of the ratio of resistivity maximums and minimums ($R$max, $R$min) and illustrating the desirable voltage sensitivity properties achieved by showing the logarithm of the ratios of peak resistivities ($R$,$R$0) at selected voltage gradients between the stated value and less than 1 volt/centimeter.

TABLE I

| | Relative Gram Mols (Oxides) | | | | | | | | | | | | Air Sintering (Temp./Time) | | | Resistivity (ohm-cm) | | Log $R_{Max}/R_{Min}$ | Log $R/R_0$ | Volt. Sens. Volt Grad V/cm |
|---|---|---|---|---|---|---|---|---|---|---|---|---|---|---|---|---|---|---|---|---|
| | Ti | Ba | Sr | Ca | Pb | Si | Dy | Ho | Y | Nb | Al | Mn | Ru | Pre °C Min | Peak °C Min | Ann. °C Min | Rm. Tp. | Peak | | | |
| 1 | 101 | 90 | | 10 | | 2 | 0.4 | | .10 | | | .08 | | 1200 60 | 1360 15 | 1225 180 | 120 | $1\times10^8$ | 5.92 | −1.5 | 700 |
| 2 | 100 | 100 | | | | 4 | | | .55 | | .20 | .06 | | 1200 60 | 1360 20 | 1225 90 | 101 | $5.7\times10^7$ | 5.88 | −0.6 | 210 |
| 3 | 100 | 90 | 5 | 5 | | 4 | | | .55 | | .20 | .06 | | 1200 60 | 1350 15 | 1225 180 | 100 | $5\times10^7$ | 5.71 | −1.5 | 685 |
| 4 | 100 | 80 | 20 | | | 2 | | | .35 | | | .03 | | 1200 60 | 1400 15 | 1225 120 | 70 | $1\times10^7$ | 5.22 | −1.0 | 600 |
| 5 | 100 | 80 | | 10 | 10 | 2 | | | .40 | | | .04 | | | 1300 15 | 1225 120 | 99 | $1\times10^7$ | 5.17 | −0.5 | 510 |
| 6 | 101 | 90 | 2 | 8 | | 4 | .45 | | | | .20 | .07 | | 1200 60 | 1350 15 | 1225 120 | 100 | $5\times10^7$ | 5.68 | −1.2 | 1000 |
| 7 | 101 | 89 | 3 | 8 | | 2 | | | .40 | | | .04 | | | 1370 30 | 1225 360 | 95 | $1\times10^8$ | 6.10 | −1.0 | 465 |
| 8 | 102 | 80 | 20 | | | 2 | | | .35 | | | .03 | | 1200 60 | 1400 15 | 1225 120 | 82 | $6.5\times10^7$ | 5.90 | −1.2 | 610 |
| 9 | 102 | 85 | 15 | | | 2 | | | .40 | | | .06 | | 1180 60 | 1360 15 | 1227 360 | 101 | $1.6\times10^9$ | 7.22 | −2.0 | 1000 |
| 10 | 1015 | 80 | 20 | | | 2 | | .20 | .10 | | | .04 | | 1200 60 | 1400 40 | 1225 20 | 134 | $1.1\times10^7$ | 4.93 | −0.5 | 600 |
| 11 | 102 | 80 | 20 | | | 2 | .30 | | .10 | | | | 0.01 | 1200 75 | 1400 15 | 1225 65 | 133 | $5\times10^6$ | 4.60 | −1.2 | 610 |

It should be understood that although preferred embodiments of the ceramic semiconductor materials of this invention have been described by way of illustrating this invention, this invention includes all modifications and equivalents of the disclosed embodiments falling within the scope of the appended claims.

We claim:

1. A ceramic semiconductor material of positive temperature co-efficient of resistivity adapted to display a sharp increase in resistivity when heated to a selected temperature comprising a base ceramic composition selected from the group consisting of titanates, stannates, and zirconates of barium, strontium, calcium, and lead having a selected addition thereto of silicon in the range from 2.0 to 4.0 mol percent, a dopant selected from the group consisting of yttrium, niobium, and rare earths heavier than dysprosium, characterized in that the material further includes ruthenium in the range of 0.001 to 0.020 mol percent as an activator to reduce the voltage sensitivity of the material at said selected temperature.

* * * * *